United States Patent
Wang et al.

(10) Patent No.: US 6,204,838 B1
(45) Date of Patent: Mar. 20, 2001

(54) CONTROLLING SCROLLS OF A SCREEN IMAGE

(75) Inventors: Han Che Wang, Taipei Hsien; Shu-Ming Liu, Taipei; Hong-Che Yen, Taipei; Chen-Ming Chang, Taipei, all of (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/082,757

(22) Filed: May 21, 1998

(51) Int. Cl.[7] ........................................ G09G 5/08
(52) U.S. Cl. ............... 345/161; 345/163; 345/164; 345/167
(58) Field of Search ................... 345/156, 157, 345/159, 161, 163, 164, 167, 168

(56) References Cited

U.S. PATENT DOCUMENTS

| | | | |
|---|---|---|---|
| 5,157,381 | * 10/1992 | Cheng | 345/163 |
| 5,298,919 | * 3/1994 | Chang | 345/167 |
| 5,446,481 | * 8/1995 | Gillick et al. | 345/157 |
| 5,530,455 | * 6/1996 | Gillick et al. | 345/156 |
| 5,771,038 | * 6/1998 | Wang | 345/163 |
| 5,883,619 | * 3/1999 | Ho et al. | 345/163 |

* cited by examiner

Primary Examiner—Vijay Shankar

(57) ABSTRACT

The present invention discloses a pointing device for scrolling a screen image. The pointing device comprises a chassis, a housing having an opening on its top mounted on the chassis, a vertical sensor installed on the chassis below the opening, a plurality of horizontal sensors installed on the chassis beside the vertical sensor, and a control stick vertically installed inside the opening of the housing comprising a top end and a bottom end. The bottom end of the control stick is in contact with the vertical sensor whereas the top end of the control stick protrudes from the opening of the housing and can be horizontally moved within a predetermined angle with respect to the bottom end of the control stick serving as its center. The pointing device further comprises a plate horizontally installed at the bottom end of the control stick with its bottom side positioned above the horizontal sensors. Horizontal movement of the top end of the control stick will cause corresponding movement of the plate which then causes the bottom surface of the plate to trigger at least one horizontal sensor. The pointing device also comprises a control device electrically connected to the vertical and horizontal sensors for detecting vertical movements of the control stick using the vertical sensor and generating correspondent vertical signals, and detecting horizontal movements of the control stick using the horizontal sensors and generating correspondent horizontal signals.

17 Claims, 5 Drawing Sheets

CONTROLLING SCROLLS OF A SCREEN IMAGE

BACKGROUND OF THE INVENTION

1. Field of the Invention

The present invention relates to a computer pointing device, and more particularly, to a pointing device for controlling scrolls of a screen image.

2. Description of the Prior Art

A traditional pointing device commonly uses a rolling wheel rotatable along a front-and-rear direction to scroll a screen image. It comprises a vertical sensor installed below the rolling wheel for detection of its movements. The rolling wheel comprises a chassis installed on a top side of a mouse and can be clicked to trigger the vertical sensor. The vertical sensor is used for generating control signals such as a page mode scrolling command or a line mode scrolling command. However, the rolling wheel has a very complicated mechanical and electrical interface.

For continuous scrolling of the screen image, the user must repeatedly rotate the rolling wheel. In addition, the rolling wheel must be pressed down in order to trigger a different control mode. The action of simultaneously pressing down the rolling wheel while repeatedly moving it in order to trigger a different control mode is a difficult action to perform for the user.

SUMMARY OF THE INVENTION

It is therefore a primary objective of the present invention to provide a pointing device for scrolling a screen image to solve the above mentioned problems.

In a preferred embodiment, the present invention comprises a pointing device comprising:

a chassis;

a housing comprising an opening on its top mounted on the chassis;

a vertical sensor installed on the chassis below the opening;

a plurality of horizontal sensors installed on the chassis beside the vertical sensor;

a control stick vertically installed inside the opening of the housing comprising a top end and a bottom end wherein the bottom end is in contact with the vertical sensor, the top end protrudes from the opening of the housing and can be horizontally moved within a predetermined angle with respect to the bottom end of the control stick as its center;

a plate horizontally installed at the bottom end of the control stick comprising a bottom side positioned above the horizontal sensors wherein horizontal movement of the control stick will move the plate allowing the bottom side of the plate to trigger at least one horizontal sensor; and a control device electrically connected to the vertical and horizontal sensors for detecting vertical movements of the control stick using the vertical sensor and generating correspondent vertical signals, and detecting horizontal movements of the control stick using the horizontal sensors and generating correspondent horizontal signals.

It is an advantage of the present invention that the pointing device has a very simple structure and a very compact size. Moreover, when continuously scrolling the screen image, the control stick needs only to be moved in one direction. Used in this manner, the device creates comfort for the user through its ease of use.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
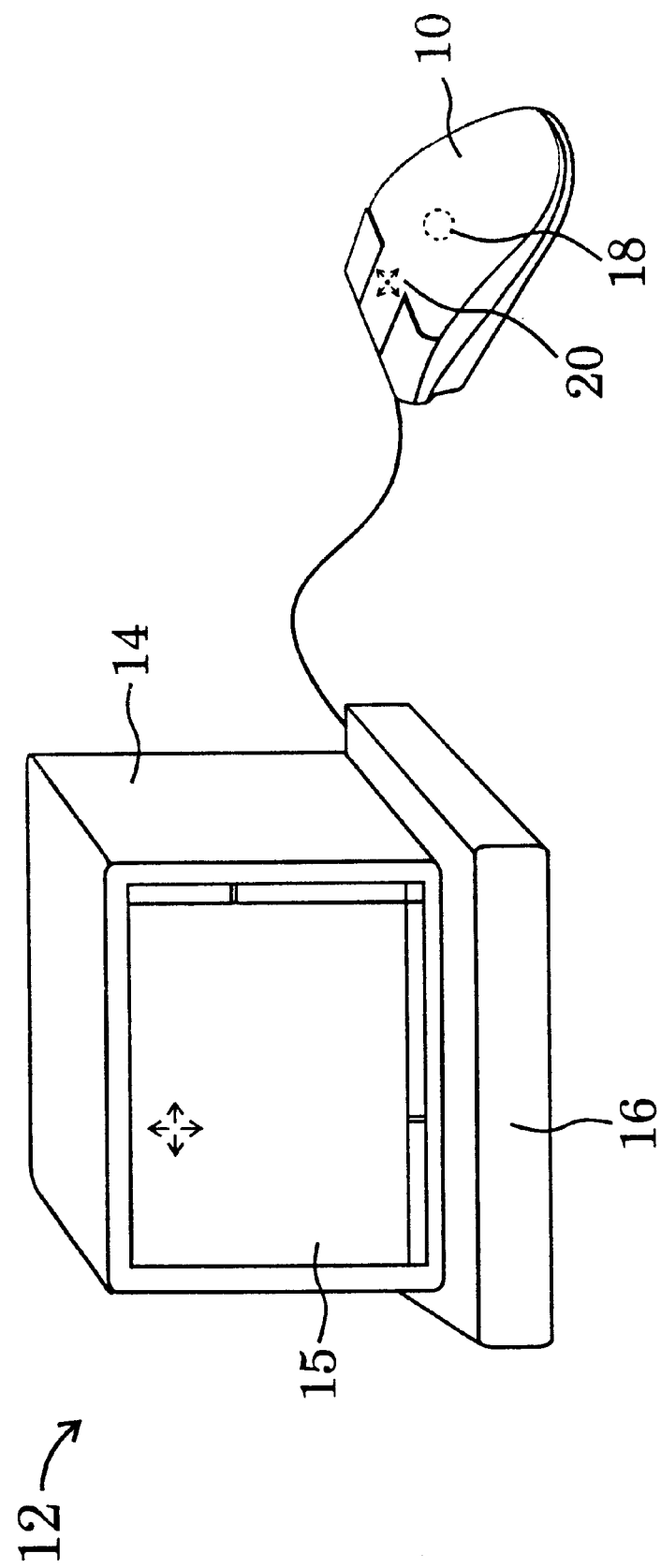
FIG. 1 is a perspective view of a pointing device and a computer according to the present invention.

Please refer to FIG. 1. FIG. 1 shows a pointing device 20 installed on a mouse 10. The mouse 10 is electrically connected to a computer 12 according to the present invention and comprises a rotatable ball 18 installed on its bottom side. The computer 12 comprises a monitor 14 for displaying a screen image 15, and a processor 16 electrically connected between the monitor 14 and the mouse 10 for controlling displays of the screen image 15.

Figure 2:
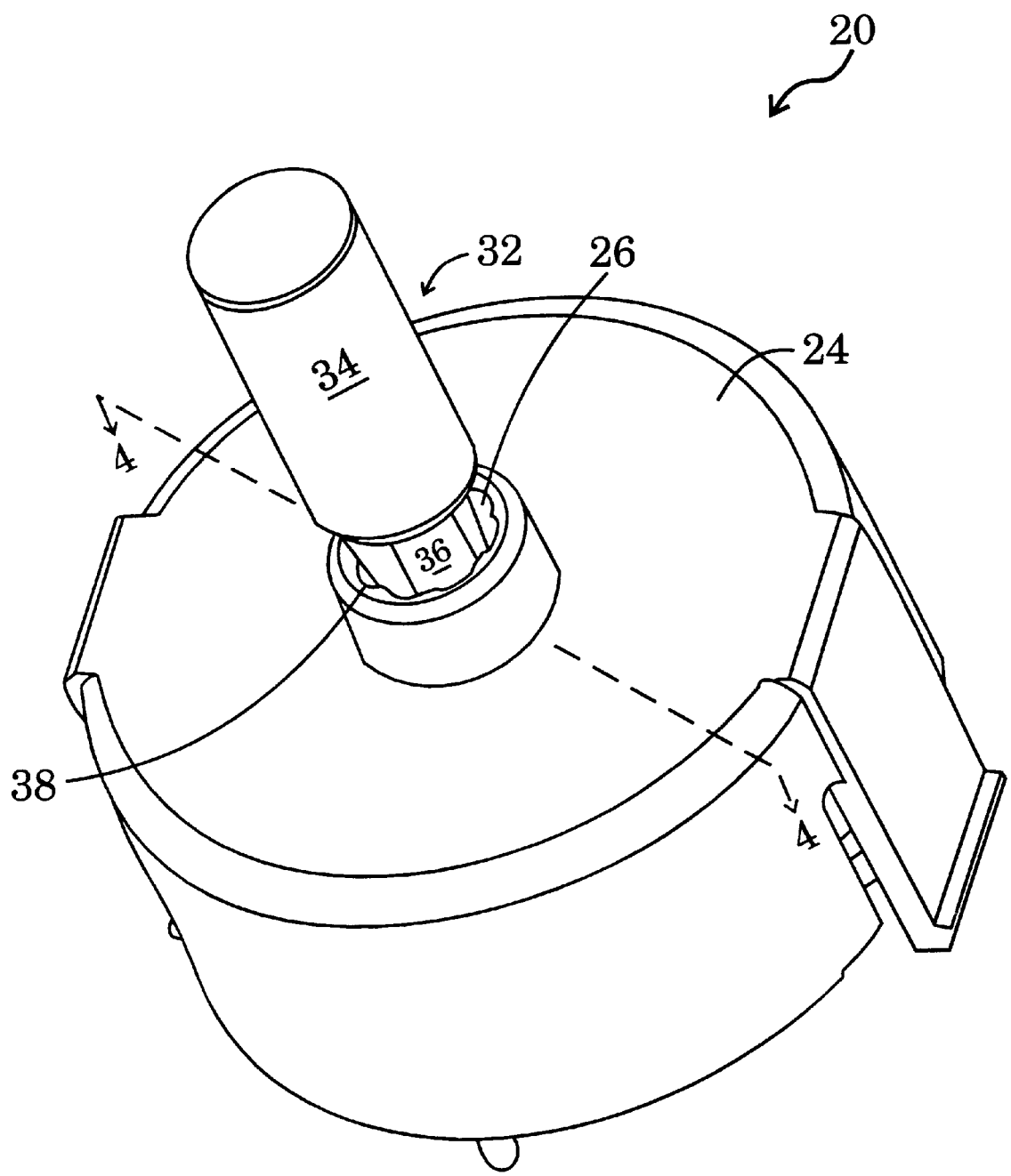
FIG. 2 is a perspective view of the pointing device shown in FIG. 1.
Figure 3:
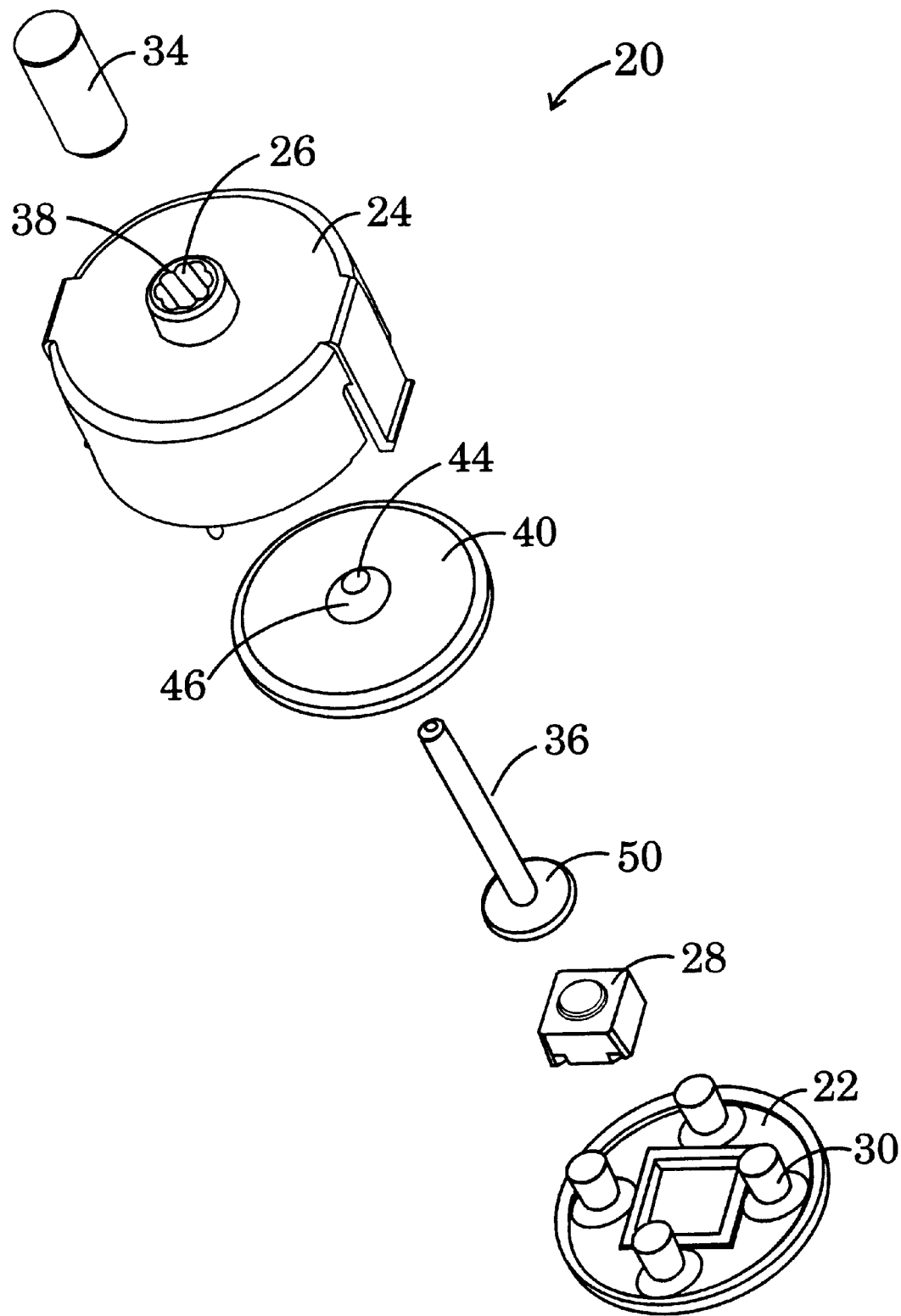
FIG. 3 is a component diagram of the pointing device shown in FIG. 2.
Figure 4:
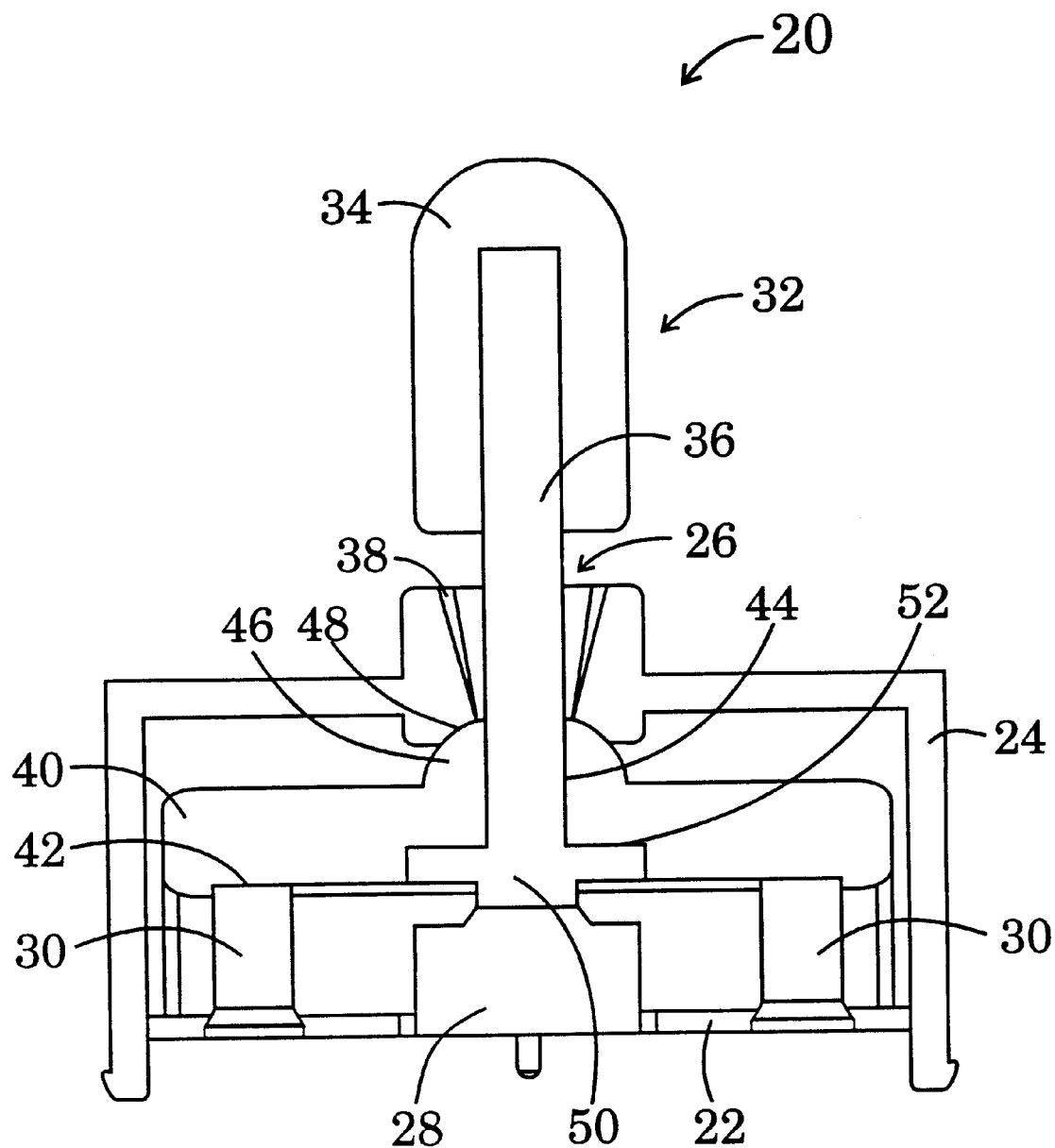
FIG. 4 is a sectional view along line 4—4 of the pointing device shown in FIG. 2.

Please refer to FIG. 2 to FIG. 4. FIG. 2 is a perspective view of the pointing device 20. FIG. 3 is a component diagram of the pointing device 20. FIG. 4 is a sectional view along line 4—4 of the pointing device 20 in FIG. 2. The pointing device 20 comprises a chassis 22, a housing 24, a vertical sensor 28, four horizontal sensors 30, a control stick 32, and a circular plate 40.

The housing 24 is mounted on the chassis 22 and has an opening 26 on its top. The vertical sensor 28 is installed on the chassis 22 below the opening 26. The four horizontal sensors 30 are installed on the chassis 22 and positioned in four mutually perpendicular directions of the vertical sensor 28. The control stick 32 is vertically installed inside the opening 26 of the housing 24. It comprises a top end 34 protruding from the opening 26 of the housing 24, and a bottom end 36 in contact with the top of the vertical sensor 28. The top end 34 of the control stick is moved horizontally with respect to the bottom end 36 within a predetermined angle, the bottom end 36 of the control stick 32 is being the center of reference.

The circular plate 40 is horizontally installed on the bottom end 36 of the control stick 32. It comprises a bottom side 42 positioned above the four horizontal sensors 30. When the top end 34 of the control stick 32 is moved horizontally, the circular plate 40 will be driven causing the bottom side 42 of the plate 40 to trigger one or two adjacent horizontal sensors 30. The plate 40 further comprises a vertical sliding channel 44 positioned at a center of the plate 40. The vertical sliding channel 44 is installed on the control stick 32 and is slidable along a vertical direction. When the control stick 32 is vertically depressed, the bottom end 36 of the control stick 32 will trigger the vertical sensor 28 while the sliding channel 44 will temporarily separate the plate 40 from the control stick 32 thereby preventing the four horizontal sensors 30 from being triggered.

The housing 24 comprises a guiding device 38 installed on its opening 26 for guiding horizontal movement directions of the control stick 32. In this embodiment, the guiding device 38 comprises eight grooves positioned at eight symmetrical directions so that the control stick 32 can only be pushed toward one of these eight directions.

The circular plate 40 comprises a half spherical shaped protruding button 46 installed above its center, with an upper opening of the sliding channel 44 positioned at the top end. The housing 24 comprises a half spherical shaped recess 48 installed below its opening 26. The protruding button 46 of the circular plate 40 is in contact with the recess 48 below the opening 26 of the housing 24 and is slidable. As the top end 30 of the control stick 32 is moved horizontally, the plate 40 shifts in tandem causing the protruding button 46 of the plate 40 to make corresponding movements at the recess 48 below the opening 26 of the housing 24. The plate 40 is constrained between the opening 26 and the four horizontal sensors 30 so it will not move when the control stick 32 is depressed.

The control stick 32 further comprises a circular base 50 installed on the bottom end 36 of the control stick 32, and the circular plate 40 comprises a correspondent circular recess 52 below its center. The circular recess 52 of the circular plate 40 is mounted on the circular base 50 of the control stick 32. Horizontal movement of the top end 34 of the control stick 32 causes the circular base 50 to move plate 40 accordingly. This allows the triggering of the four horizontal sensors 30 and subsequent detection of horizontal movements of the control stick 32.

Figure 5:
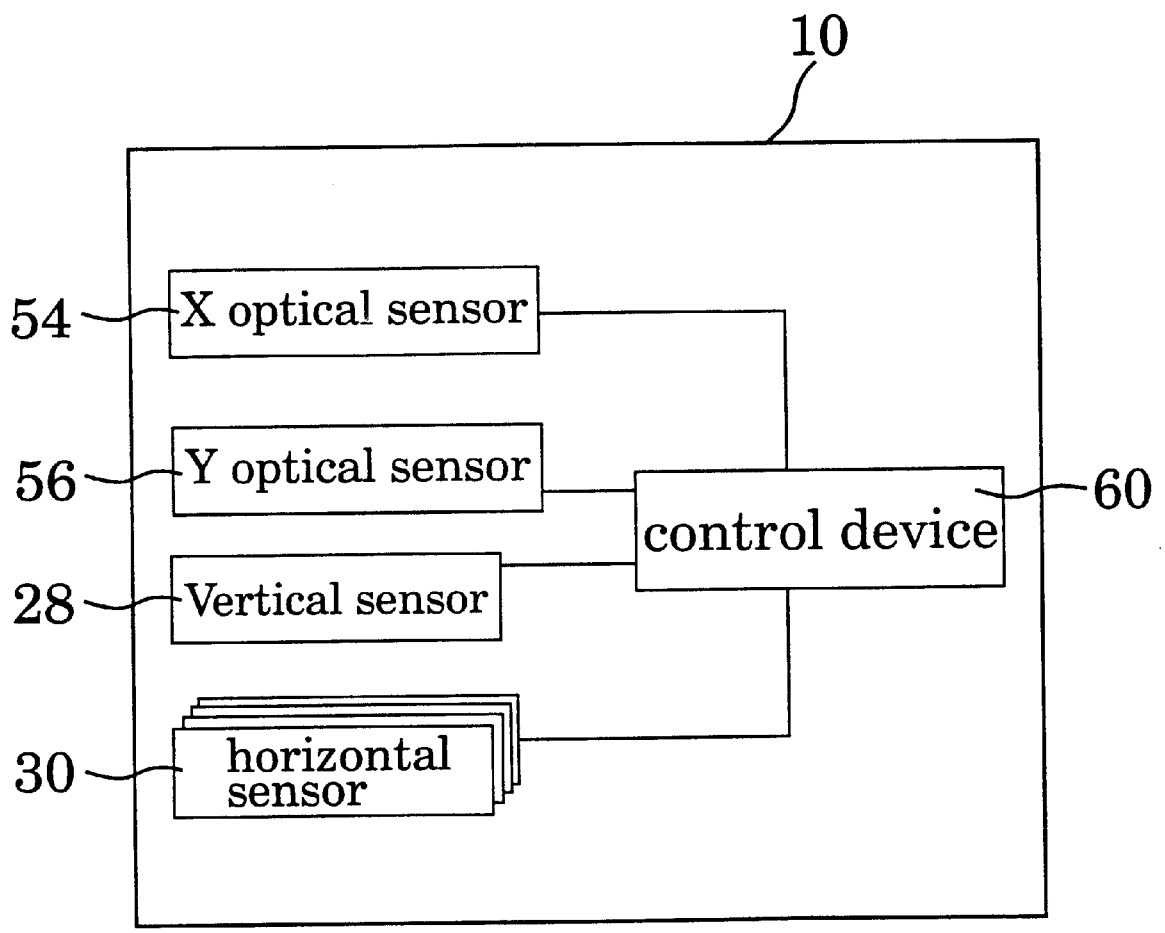
FIG. 5 is a function block diagram of the mouse shown in FIG. 1.

Please refer to FIG. 5. FIG. 5 is a functional block diagram of the mouse 10 shown in FIG. 1. The mouse 10 comprises a vertical sensor 28, four horizontal sensors 30, two optical sensors 54 and 56, and a control device 60. The control device 60 uses the vertical sensor 28 to detect vertical movements of the control stick 28 to generate correspondent vertical signals and uses the four horizontal sensors 30 to detect horizontal movements of the control stick 32 to generate correspondent horizontal signals. It also uses the two optical sensors 54 and 56 to detect movements of the rotatable ball 18 on the bottom side of the mouse 10 in two mutually perpendicular directions to generate two-dimensional pointing signals accordingly.

The vertical sensor 28 and the horizontal sensors 30 are on and off switches. If the vertical sensor 28 is switched off while one of the horizontal sensors 30 is triggered, the control device 60 will generate a corresponding horizontal signal causing the image 15 to be continuously scrolled by the processor 16. When two neighboring horizontal sensors 30 are triggered at the same time, the image 15 will be continuously scrolled by the processor 16 along a corresponding 45-degree angle.

If the vertical sensor 28 and one of the horizontal sensors 30 are triggered, the control device 60 will generate a vertical signal and a corresponding horizontal signal causing the processor 16 to continuously scroll the image 15 at a high speed. When the vertical sensor 28 along with two neighboring horizontal sensors 30 are triggered at the same time, the processor 16 will scroll the image 15 continuously at a high speed along a corresponding 45-degree angle.

The vertical sensor 28 and the horizontal sensors 30 can be replaced by strain gauges. Triggering of the strain gauges will cause the control device 60 to generate corresponding vertical or horizontal signals which are determined by forces exerted on the strain gauges. These signals will cause the processor 16 to continuously scroll the screen image 15 in a horizontal directional movement dictated by the control stick 32 and characterized by the horizontal signals and scroll speeds generated by the control device 60.

As compared with the prior art pointing device, the pointing device 20 of the present invention has a simpler structure and a more compact size. Moreover, when the screen image 15 is continuously scrolled, the control stick 32 need only be moved in one direction. Using this method, control of the pointing device 20 provides comfort and ease of use for the user. This is in direct contrast to the prior art rolling wheel which must be moved repeatedly by the user. Furthermore, an ordinary mouse equipped with the pointing device 20 will show enhanced performance.

Those skilled in the art will readily observe that numerous modifications and alterations of the device may be made while retaining the teachings of the invention. Accordingly, the above disclosure should by construed as limited only by the metes and bounds of the appended claims.

What is claimed is:

1. A pointing device comprising:
   a chassis;
   a housing having an opening on its top mounted on the chassis;
   a vertical sensor installed on the chassis below the opening;
   a plurality of horizontal sensors installed on the chassis beside the vertical sensor;
   a control stick vertically installed inside the opening of the housing having a top end and a bottom end wherein the bottom end is in contact with the vertical sensor and the top end protruding from the opening of the housing can be horizontally moved within a predetermined angle with respect to the bottom end of the control stick as its center;
   a plate horizontally installed at the bottom end of the control stick having a bottom side positioned above the horizontal sensors and a vertical sliding channel installed at its middle portion wherein the bottom end of the control stick is slidable and vertically mounted in the vertical sliding channel of the plate, and wherein when the top end of the control stick is horizontally moved, the control stick will move the plate allowing the bottom side of the plate to trigger at least one horizontal sensor, and when the control stick is depressed downward substantially at a vertical angle, the bottom end of the control stick will trigger the vertical sensor and the bottom side of the plate will not trigger the plurality of horizontal sensors; and
   a control device electrically connected to the vertical and horizontal sensors for detecting vertical movements of the control stick by using the vertical sensor and generating correspondent vertical signals, and detecting horizontal movements of the control stick by using the horizontal sensors and generating correspondent horizontal signals.

2. The pointing device of claim 1 wherein the plate is a circular plate with the vertical sliding channel installed at its center.

3. The pointing device of claim 2 wherein the circular plate comprises a half spherical shaped protruding button installed above its center, with an upper opening of the sliding channel positioned at a top end of the protruding button, and wherein the housing comprises a half spherical shaped recess below its opening slidably in contact with the protruding button of the circular plate, and horizontal movements of the top end of the control stick will cause movements of the circular plate such that the protruding button of the circular plate will make correspondent movements at the half spherical shaped recess below the opening of the housing.

4. The pointing device of claim 3 wherein the plate is constrained between the opening of the housing and the horizontal sensors to prevent the plate from moving up and down with the control stick.

5. The pointing device of claim 4 wherein the control stick further comprises a circular base installed at the bottom end of the control stick, and wherein the circular plate comprises a correspondent circular recess installed below its center and mounted on the circular base of the control stick such that horizontal movements of the top end of the control stick will move the circular plate through the circular base of the control stick.

6. The pointing device of claim 1 wherein the vertical sensor or the horizontal sensor is an on and off switch which, when triggered, causes the control device to generate vertical or horizontal signals according to changes in its present state.

7. The pointing device of claim 1 wherein the horizontal or vertical sensor can be a strain gauge which, when triggered, causes the control device to generate a correspondent horizontal or vertical signal in proportion to the force sensed by the strain gauge.

8. The pointing device of claim 1 comprising four horizontal sensors installed on the chassis in four mutually perpendicular directions of the vertical sensor for detecting horizontal movements of the control stick.

9. The pointing device of claim 8 wherein when the top end of the control stick is moved horizontally, the bottom side of the plate will trigger at most two horizontal sensors.

10. The pointing device of claim 1 wherein the housing comprises a guiding device installed at its opening for guiding horizontal movement directions of the control stick.

11. The pointing device of claim 10 wherein the guiding device guides the control stick to make horizontal movements in eight symmetrical directions.

12. The pointing device of claim 1 wherein the control device is electrically connected to a computer which comprises a displaying device for displaying a screen image and a processor electrically connected between the displaying device and the control device for controlling displays of the screen image, and wherein the processor can control scrolling directions of the screen image according to the horizontal signals generated by the control device.

13. The pointing device of claim 1 wherein the pointing device is installed on a computer mouse which comprises a rotatable ball and two optical sensors electrically connected to the control device for detecting movements of the ball in two mutually perpendicular directions, and the control device will generate two-dimensional pointing signals according to outputs of the two optical sensors.

14. A pointing device for controlling scrolls of a screen image of a computer, the computer comprising a displaying device for displaying the screen image and a processor for controlling displays of the screen image, the pointing device comprising:

a housing having an opening on its top;

a control stick movably installed inside the opening of the housing comprising a top end and a bottom end, the bottom end of the control stick comprising a horizontal plate;

a vertical sensor installed inside the housing and below the control stick:

a plurality of horizontal sensors installed inside the housing below the horizontal plate of the control stick; and a control device electrically connected between the vertical sensor, the plurality of horizontal sensors, and the computer for detecting vertical and horizontal movements of the control stick according to the vertical sensor and the plurality of horizontal sensors, and generating correspondent vertical and horizontal signals;

wherein the processor of the computer can control the scrolls of the screen image according to the vertical and horizontal signals generated by the control device.

15. The pointing device of claim 14 wherein the pointing device comprises four horizontal sensors installed in four mutually perpendicular directions of the bottom end of the control stick, when the processor receives a horizontal signal generated by the four horizontal sensors, the processor will detect a movement direction of the control stick according the horizontal signal and control the image screen to scroll toward the movement direction.

16. The pointing device of claim 15 wherein the plate further comprises a vertical sliding channel installed in a middle portion of the plate, and wherein the bottom end of the control stick is vertically installed inside the vertical sliding channel of the plate in a slidable manner, a vertical depression of the control stick will cause the bottom end of the control stick to slide downward inside the vertical sliding channel of the plate and cause triggering of the vertical sensor, and the control device can detect the depressed state of the control stick by using the vertical sensor and generate a correspondent vertical signal.

17. The pointing device of claim 16 wherein when the processor receives the vertical signal and the horizontal signal generated by the four horizontal sensors at the same time, the processor can determine a movement direction of the control stick according to the horizontal signal and control the image screen to scroll toward the movement direction at an increased speed.

* * * * *